United States Patent
Cronin et al.

[19]

[11] Patent Number: 6,042,502
[45] Date of Patent: Mar. 28, 2000

[54] METHOD AND APPARATUS FOR GENERATING VELOCITY COMMANDS IN RESPONSE TO RAPID CHANGES IN OPERATOR INPUTS

[75] Inventors: Michael G. Cronin, Peoria; Brian D. Kuras, East Peoria; Kevin J. Lueschow, Elmwood, all of Ill.

[73] Assignee: Caterpillar Inc., Peoria, Ill.

[21] Appl. No.: 09/288,427

[22] Filed: Apr. 8, 1999

[51] Int. Cl.[7] .................................................. F16H 61/46
[52] U.S. Cl. .......................................... 477/68; 477/120
[58] Field of Search ...................................... 477/68, 120

[56] References Cited

U.S. PATENT DOCUMENTS

| | | | |
|---|---|---|---|
| 4,368,798 | 1/1983 | Meyerle et al. | 477/68 |
| 4,464,952 | 8/1984 | Stubbs | 477/68 |
| 4,836,056 | 6/1989 | Nakawaki et al. | 74/866 |
| 4,852,429 | 8/1989 | Kunzer et al. | 477/43 |
| 5,207,736 | 5/1993 | Fredriksen | 477/68 |
| 5,478,288 | 12/1995 | Sakakibara et al. | 475/129 |
| 5,568,748 | 10/1996 | Carlson et al. | 74/336 R |
| 5,624,339 | 4/1997 | Coutant et al. | 475/72 |
| 5,658,217 | 8/1997 | Tsukada | 477/109 |

*Primary Examiner*—Dirk Wright
*Attorney, Agent, or Firm*—John W. Morrison

[57] ABSTRACT

A control apparatus for a continuously variable transmission is disclosed. The control apparatus includes a transmission speed sensor which generates actual velocity signals in response measuring a speed of an output shaft of the continuously variable transmission. The control apparatus further includes a first input device which is positionable in one of a number of positions and generates a desired velocity signal corresponding to the one of the number of positions. The control apparatus yet further includes a controller operable to receive the desired velocity signals, receive the actual velocity signals, determine when rapid changes in the desired velocity are requested by an operator, and generate a commanded acceleration and a commanded velocity based on a jerk value which exceeds a predetermined jerk limit in response to the rapid changes in the desired velocity. A method of controlling a continuously variable transmission is also disclosed.

18 Claims, 8 Drawing Sheets

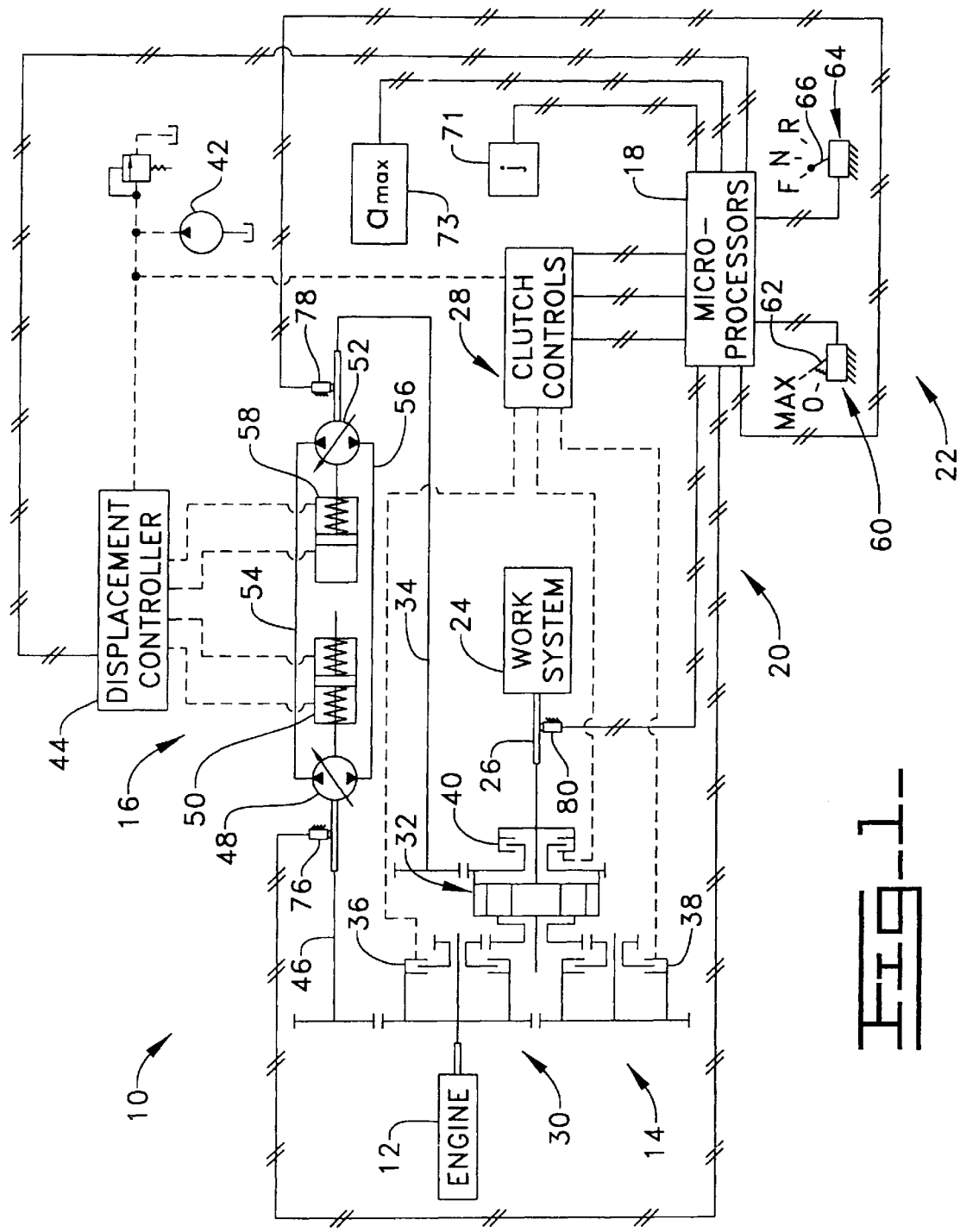
Fig_1

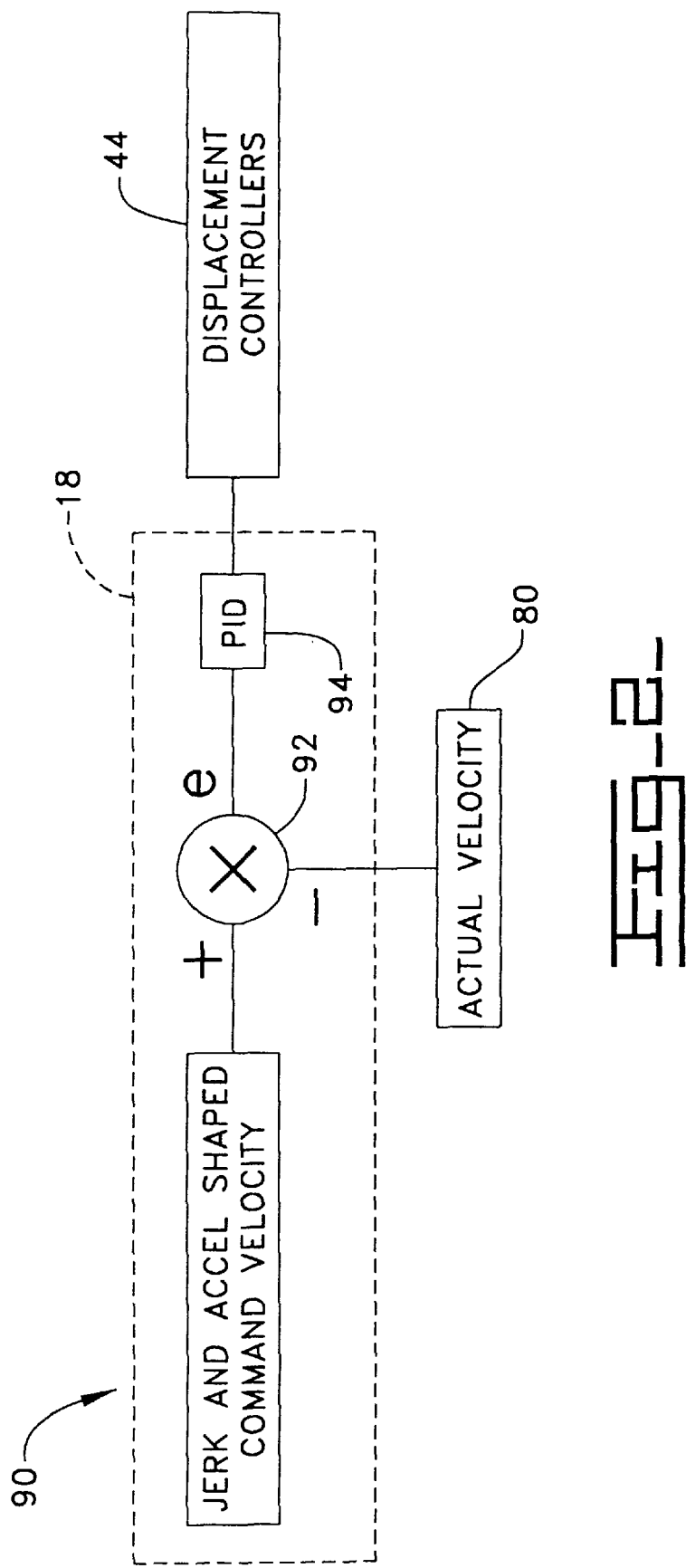

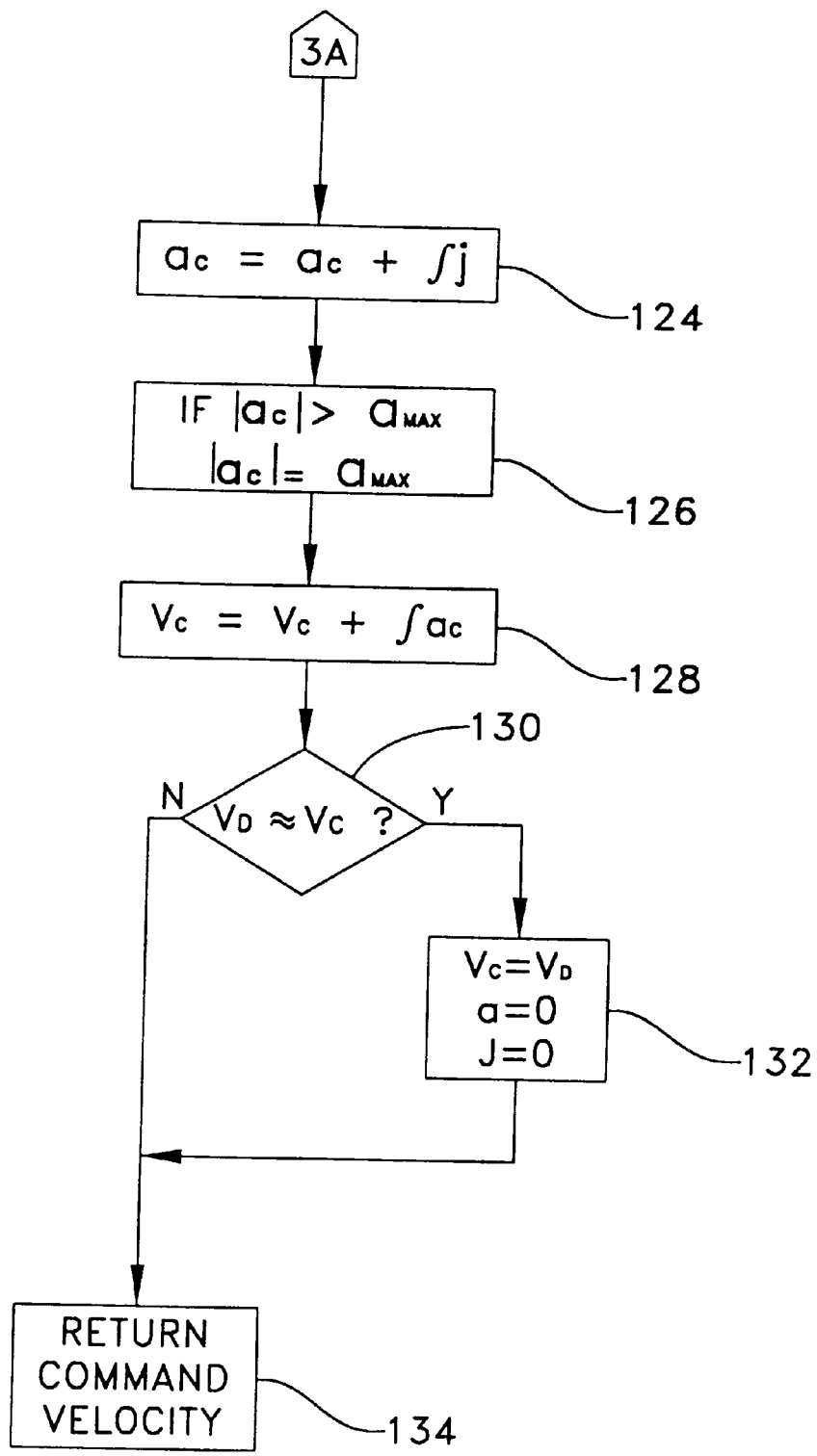
Fig-3B-

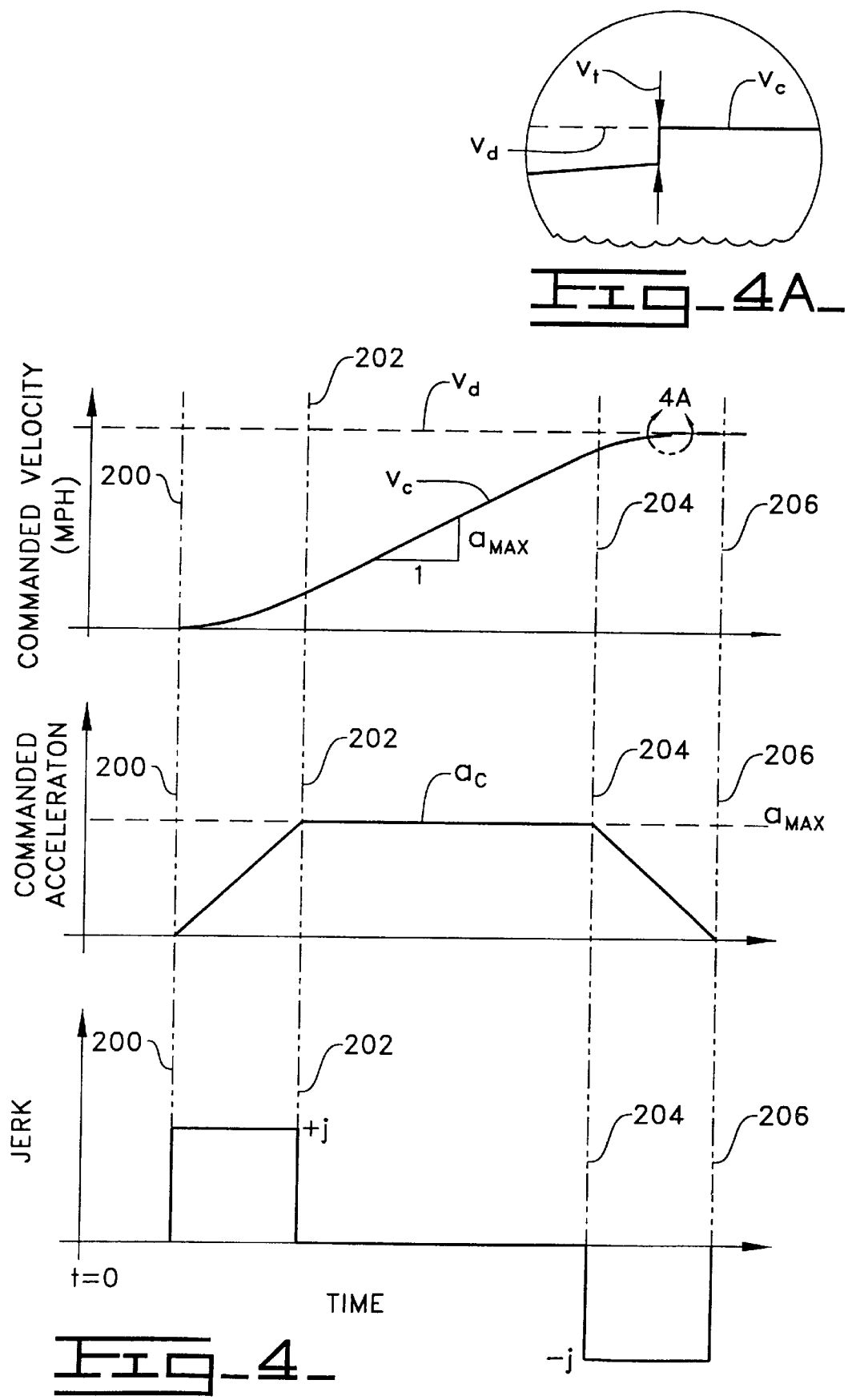

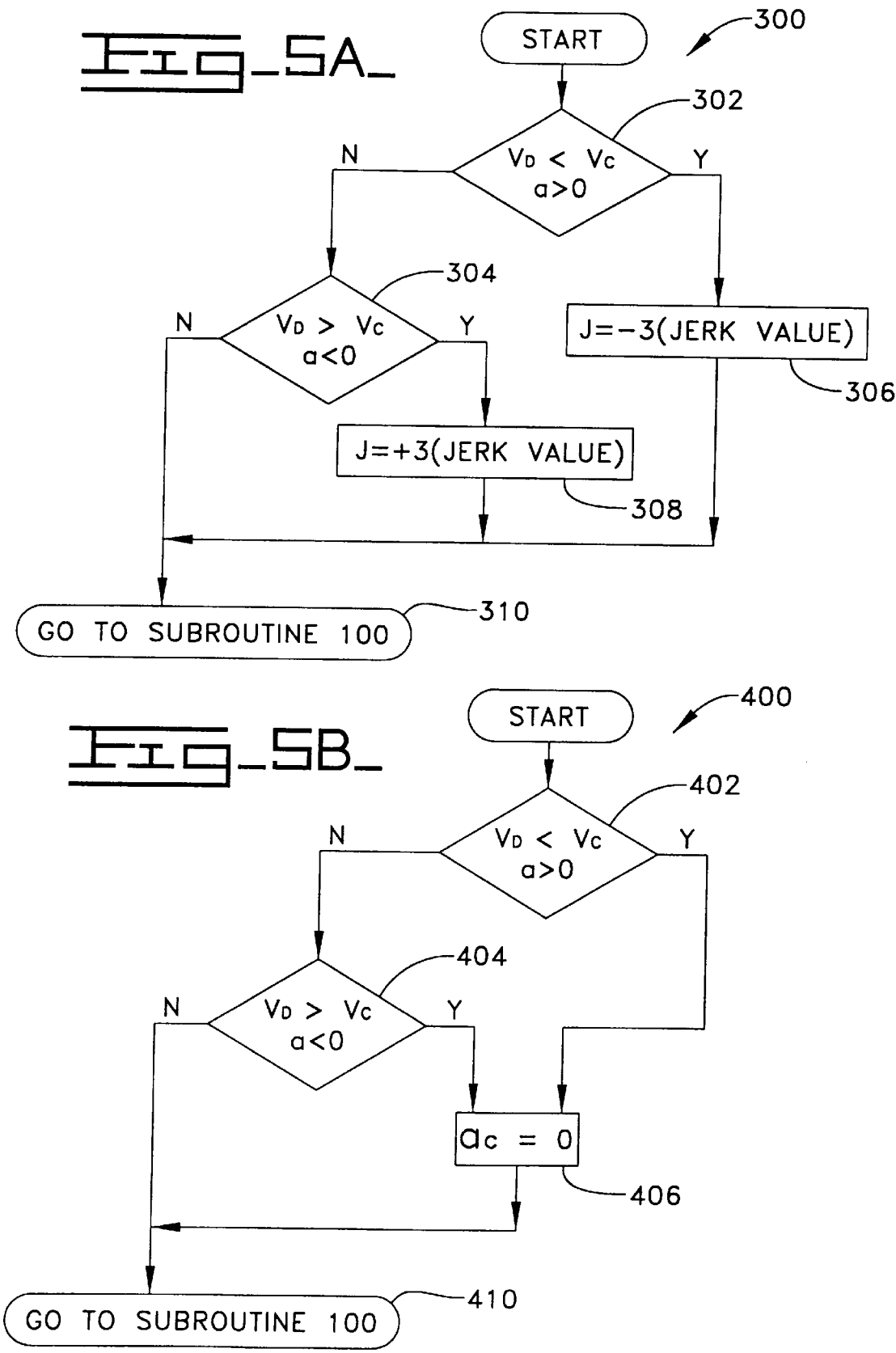

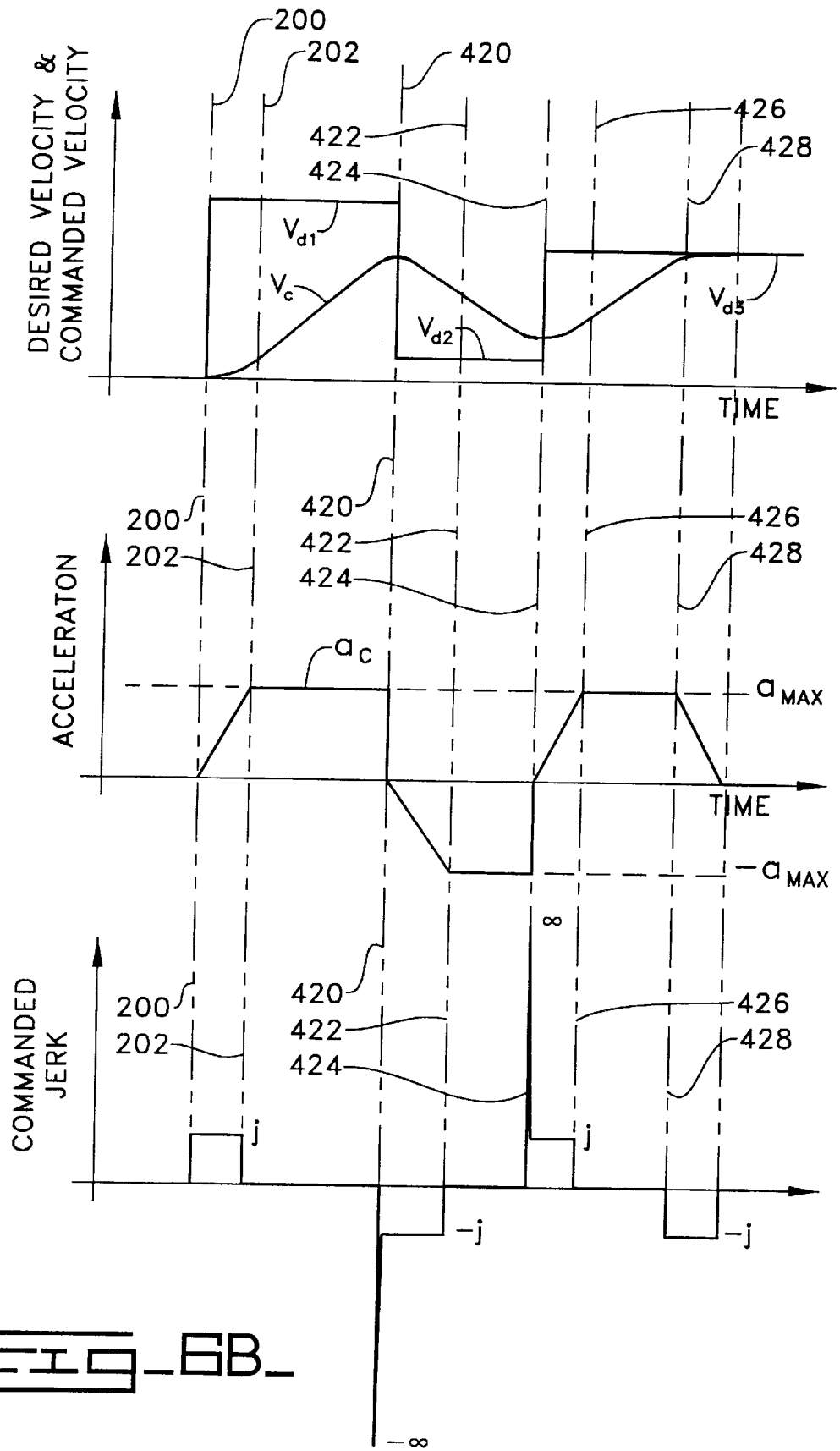
Fig-6B-

METHOD AND APPARATUS FOR GENERATING VELOCITY COMMANDS IN RESPONSE TO RAPID CHANGES IN OPERATOR INPUTS

TECHNICAL FIELD OF THE INVENTION

The present invention generally relates to continuously variable transmission, and more specifically to a method and apparatus for generating velocity commands in response to rapid changes in operator inputs.

BACKGROUND OF THE INVENTION

Many work machines, particularly earth working machines, use a hydrostatic drive system to drive the traction wheels or tracks of the work machine. The hydrostatic drive system can provide a continuously variable speed output to the wheels or tracks of the work machine. In particular, the speed can be continuously varied by controlling the displacements of either a hydraulic pump or a hydraulic motor which comprise the hydrostatic drive system.

One problem with earth moving machines which use hydrostatic transmissions is that the speed output can be varied rapidly thereby producing a rapid response. This rapid response can result in high, undesirable jerk which can cause discomfort to an operator of the work machine. In addition, the undesirable high jerk can cause the operator to lose control of the machine as the rapid movement of the machine can create unwanted speed pedal modulations. The unwanted speed pedal modulations create control signals which cause the work machine to move in an unintended manner.

However, in some situations the operator may decide to drastically change the desired velocity by rapidly changing the position of the pedal. In such cases, the operator generally wants a high jerk because he has commanded the rapid change in desired velocity. If the apparatus used to generate velocity commands is biased to provide a slow smooth response, then the resulting change in the commanded velocity will seem extremely slow to the operator of the work machine. Even if the operation of the work machine is set to respond with a relatively high jerk, the work machine may not respond rapidly enough to provide the operator with the sensation that the work machine is responding rapidly to the drastic changes commanded by the operator.

What is needed therefore is a method and apparatus for generating velocity commands in response to rapid changes in operator inputs which overcomes the above-mentioned drawbacks.

DISCLOSURE OF THE INVENTION

In accordance with a first aspect of the present invention, there is provided a control apparatus for a continuously variable transmission. The control apparatus includes a transmission speed sensor which generates actual velocity signals in response measuring a speed of an output shaft of the continuously variable transmission. The control apparatus further includes a first input device which is positionable in one of a number of positions and generates a desired velocity signals corresponding to the one of the number of positions. The control apparatus yet further includes a controller operable to receive the desired velocity signal, receive the actual velocity signal, determine when rapid changes in the desired velocity are requested by an operator, and generate a commanded acceleration and a commanded velocity based on a jerk value which exceeds a predetermined jerk limit in response to the rapid changes in the desired velocity.

In accordance with a second aspect of the present invention, there is provided a method of controlling a continuously variable transmission. The transmission includes a transmission speed sensor which generates an actual velocity signal in response measuring speed of an output shaft of the continuously variable transmission. The transmission further includes a first input device which is positionable in one of a number of positions and generates a desired speed signal corresponding to the one of the number of positions. The method includes the steps of receiving the desired velocity signal and receiving the actual velocity signal. The method further includes the step of determining when rapid changes in desired velocity are requested by an operator. The method yet further includes the step of generating a commanded velocity and commanded acceleration based on a jerk value which exceeds a predetermined jerk limit in response to the determining step.

BRIEF DESCRIPTION OF THE DRAWINGS

FIG. 1 is a schematic view of a hydro-mechanical, continuously variable transmission which incorporates the features of the present invention therein;

FIG. 2 is a schematic view of the a closed loop control which produces control signals for a displacement controllers of the continuously variable transmission of FIG. 1;

FIG. 3B is a flow chart used to calculate commanded acceleration and commanded velocity;

FIG. 4 is a graph which illustrates commanded velocity, commanded acceleration, and jerk in response to the desired velocity;

FIG. 4A is an enlarged portion of the graph of FIG. 4;

FIG. 5A is a flow chart which illustrates a first method of adjusting the commanded acceleration and commanded velocity in response to rapid changes in desired velocity;

FIG. 5B is a flow chart which illustrates a second method of adjusting the commanded acceleration and the commanded velocity in response to rapid changes in desired velocity;

FIG. 6B is a graph which illustrates velocity, acceleration, and jerk in response to the second method of adjusting the commanded acceleration and the commanded velocity in response to rapid changes in desired velocity.

BEST MODE FOR CARRYING OUT THE INVENTION

Figure 3A:
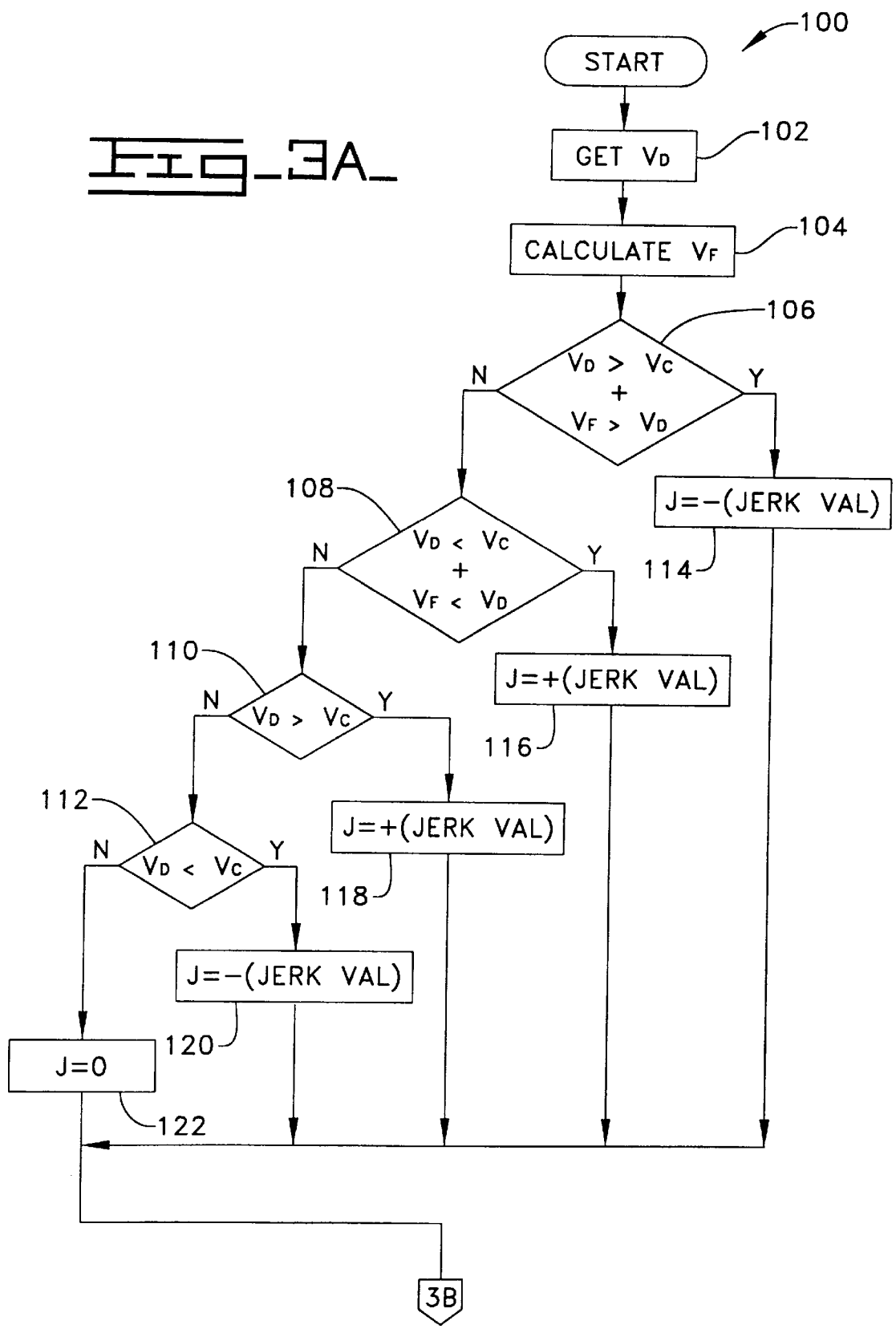
FIG. 3A is a flow chart used to set jerk values to be integrated into the commanded acceleration and the commanded velocity.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1 there is shown a transmission assembly 10 that incorporates the features of the present invention therein. The transmission assembly 10 is adapted for use in a work machine, such as a loader (not shown) having an engine 12. The transmission assembly 10 is of the continuously variable type and includes a mechanical transmission 14, a continuously variable transmission 16, a micro-processor based controller 18, a sensing arrangement 20 and a command input arrangement 22. Although the transmission assembly 10 is shown to be a continuously variable hydro-mechanical transmission, the invention is equally applicable to any type of continuously variable transmission including a hydro-mechanical, hydrostatic transmission system, or electro-mechanical transmissions. A work system 24 is connected to the transmission assembly 10 by a drive shaft 26.

The mechanical transmission 14 and an associated clutch control arrangement 28 are operatively connected to the engine 12 through a gear arrangement 30. The mechanical transmission 14 includes a summing planetary arrangement 32 operatively connected to both the engine 12 through the gear arrangement 30 and to the hydrostatic transmission 16 through a motor output shaft 34. The output of the summing planetary arrangement 32 is connected to the drive shaft 26. The mechanical transmission 14 further includes directional high speed clutches 36, 38 and a low speed clutch 40. The clutch control arrangement 28 is connected to a source of pressurized pilot fluid, such as a pilot pump 42. The controller 18 is operative to control engagement and disengagement of the respective speed clutches 36, 38 and 40 in response to electrical signals from the controller 18.

The hydrostatic transmission 16 and a displacement controller 44 are operatively connected to the engine 12 through a pump input drive shaft 46. The hydrostatic transmission 16 includes a variable displacement pump 48, a pump displacement actuator 50, a variable displacement motor 52 fluidly connected to the variable displacement pump 48 by conduits 54, 56, and a motor displacement actuator 58. The displacement controller 44 is connected to the pilot pump 42 and the controller 18. The displacement controller 44 controls movement of the respective pump and motor displacements actuators 50, 58 in response to control signals from the controller 18.

The command input arrangement 22 includes a speed input mechanism 60 having a first input device or speed pedal 62 moveable from a zero speed position to a maximum speed position for producing a desired velocity signal representative of a desired velocity $V_d$. The input arrangement 22 further includes a directional control mechanism 64 having a direction control lever 66 selectively moveable from a neutral position to a forward or a reverse position. The input arrangement 22 further includes a second input device or jerk input 71 which sends a jerk signal representative of the commanded jerk value j to the controller 18. The input arrangement 22 yet further includes a third input device or maximum acceleration input 73 which sends and acceleration signal representative of the maximum acceleration $a_{max}$ to the controller 18. The controller 18 includes RAM and ROM (not shown) that stores transmission control software, desired velocity $V_d$, the jerk value j, the commanded acceleration $a_c$, the commanded velocity $V_c$, and the maximum acceleration $a_{max}$.

The sensing arrangement 20 includes an engine speed sensor 76 operative to sense the speed of the pump input shaft 46 and direct an engine speed signal representative of the rotation speed of the output shaft of the engine 12 to the controller 18. A transmission speed sensor 78 is operative to sense the speed of the motor output shaft 34 and direct a motor output speed signal representative of the motor output speed to the controller 18. A transmission speed sensor 80 is operative to sense the speed of the output drive shaft 26 and direct an actual velocity signal representative of the actual velocity of the work machine to the controller 18.

Referring to FIG. 2, there is shown a schematic view of a closed loop control system 90 within the controller 18. The closed loop control system 90 processes the commanded velocity $V_c$ calculated by the controller 18 and actual velocity provided by the transmission speed sensor 80 and provides command signals to the displacement controller 44. In particular, the commanded velocity $V_c$ is passed into a closed loop control system 90 as a command while the actual velocity is used is passed into the closed loop control system 90 as a feedback value. In a comparator 92, the actual velocity is subtracted from the commanded velocity $V_c$ to produce an error signal which is fed into a simple proportional, integral, and derivative controller, or PID controller 94. The PID controller 94 produces a command signal based on calculations of the error signal which is directed to the displacement controller 44. The displacement controller 44 receives the command signal and responsively controls the displacement of one of the variable displacement pump 48 or the variable displacement motor 52 thereby controlling the actual velocity of the work machine to follow the commanded velocity $V_c$.

Referring now to FIG. 3A, there is shown the routine 100 used to generate the commanded velocity $V_c$ and commanded acceleration $a_c$ used by the closed loop control system 90 of FIG. 2. The routine 100 resides in the memory of the controller 18.

Advancing to step 102, the controller 18 calculates the desired velocity $V_d$ from the desired velocity signal generated in response to the positioning of the speed pedal 62. The desired velocity $V_d$ is a function of the displacement of the speed pedal 62. The desired velocity $V_d$ is stored in the memory of the controller 18 and is used for future calculations.

Advancing now to step 104, a final velocity $V_f$ is calculated. The final velocity $V_f$ is the command velocity $V_c$ that will be generated if the subroutine 100 continues with the present commanded velocity $V_c$, present commanded acceleration $a_c$, and fixed jerk value j. In particular, the final velocity $V_f$ is a steady state value calculated by integrating the fixed jerk value j over time until the commanded acceleration $a_c$ reaches zero.

The velocity commands generated by controller 18 are a summation of a number of discrete acceleration commands $a_c$ added to the current velocity command $V_c$. Each acceleration command $a_c$ is separated from a subsequent acceleration command by a loop time, or time that the controller 18 takes to generate a new commanded acceleration $a_c$ and commanded velocity $V_c$. During each loop of the of the controller, the commanded acceleration $a_c$ is incremented by the jerk value j integrated over the loop time. By analogy, this is similar to the summation of a series of constants, which can be calculated using the following well known equation:

$$\sum_{k=1}^{n} k = 1 + 2 + 3 + \ldots + n = \frac{n(n+1)}{2}$$

In the present case, the acceleration values are incremented until the commanded acceleration $a_c$ is obtained. Therefore, the commanded acceleration $a_c$ is analogous to the final value n and the acceleration increment which is equal to the jerk value j integrated over the loop time is analogous to the increment between integers, or one. Thus, to calculate a future velocity $V_f$, it is necessary to add the summed accumulation of acceleration commands to the current commanded velocity $V_c$. The resulting equation is used to calculate the final velocity $V_f$:

$$V_f = V_c + \frac{a_c\left(a_c + \int j \cdot dt\right)}{2 \cdot j}$$

Referring now to FIGS. 3A and 4, the controller 18 determines the appropriate jerk value (e.g. either a negative fixed jerk or a positive fixed jerk) in steps 106, 108, 110 and 112. Starting at a time t=0 shown in FIG. 4, the commanded velocity $V_c$, the commanded acceleration $a_c$, and the jerk value j are all equal to zero. When a positive desired velocity $V_d$ is received by the controller 18 at a time 200, the controller 18 performs the tests in steps 106, 108, 110, and 112 to determine the appropriate jerk value to apply to the commanded acceleration $a_c$ which is then be applied to the commanded velocity $V_c$.

In step 106, if the desired velocity $V_d$ is greater than the commanded velocity $V_c$ and the final velocity $V_f$, calculated in step 104, is greater than the desired velocity $V_d$, then the controller 18 advances to step 114 where a negative jerk value −j is applied to the commanded acceleration $a_c$ which is then applied to the commanded velocity $V_c$. This corresponds to an off going jerk being applied to the commanded acceleration $a_c$ between a time 204 and a time 206 so as to prevent the commanded velocity $V_c$ from overshooting the positive desired velocity $V_d$ (see FIG. 4).

Similarly, in step 108, if the desired velocity $V_d$ is less than the commanded velocity $V_c$ and the final velocity $V_f$, calculated in step 104, is less than the desired velocity $V_d$, then the controller 18 advances to step 116 where the positive jerk value +j is applied to the commanded acceleration $a_c$ which is then applied to the commanded velocity $V_c$. This corresponds to an offgoing jerk being applied to the acceleration $a_c$ in the reverse direction to prevent the commanded velocity $V_c$ from overshooting the negative desired velocity $V_d$ (not shown).

In step 110, if the desired velocity $V_d$ is greater than the commanded velocity $V_c$, then the controller 18 advances to step 118 where the positive jerk value +j is applied to the commanded acceleration $a_c$ which is then applied to the commanded velocity $V_c$. This corresponds to an oncoming jerk being applied to the commanded acceleration $a_c$ between the time 200 and a time 202 (see FIG. 4).

Similarly, in step 112, if desired velocity $V_d$ is less than the commanded velocity $V_c$, then the controller 18 advances to step 120 where a negative jerk value −j is applied to the commanded acceleration $a_c$ which is then applied to the commanded velocity $V_c$. This corresponds to an oncoming jerk being applied to the commanded acceleration $a_c$ in the reverse direction (not shown). If the desired velocity $V_d$ is equal to the commanded velocity $V_c$, the controller 18 advances to step 122 where the jerk value j is set to zero to prevent further changes in the commanded acceleration $a_c$ and commanded velocity $V_c$. From the steps 114, 116, 118, 120, or 122 the controller 18 advances to the step 124 of FIG. 3B.

Referring now to FIGS. 3B and 4, in step 124, the controller 18 integrates the jerk value j obtained in steps 114, 116, 118, 120, or 122 over the loop time and adds the result to the commanded acceleration $a_c$. For example, when a positive desired velocity $V_d$ is received by the controller 18, the positive jerk value +j is integrated and added to the commanded acceleration $a_c$ between the time 200 and 202 to initiate motion in the forward direction. On the other hand the negative jerk value −j is integrated and added to the commanded acceleration $a_c$ between the time 204 and the time 206 as the commanded velocity $V_c$ converges with the positive desired velocity $V_d$ (see FIG. 4). After the commanded acceleration $a_c$ has been incremented, the controller 18 advances to step 126.

In step 126, the controller 18 compares the commanded acceleration $a_c$ to the maximum acceleration $a_{max}$. If the absolute value of the commanded acceleration $a_c$ is greater than the maximum acceleration $a_{max}$, then the absolute value of the commanded acceleration $a_c$ is set to the maximum acceleration $a_{max}$ thereby limiting the acceleration of the work machine. The commanded acceleration $a_c$ is limited to the maximum acceleration $a_{max}$ between the time 202 and the time 204. It should be appreciated that the maximum acceleration $a_{max}$ is received by the controller 18 from the acceleration input device 73 shown in FIG. 1. For example if the maximum acceleration $a_{max}$ is 0.4 G's and the commanded acceleration $a_c$ is equal to 0.45 G's, then the acceleration command $a_c$ is set to the maximum acceleration $a_{max}$ of 0.4 G's. The controller 18 then advances to the step 128.

In step 128, the commanded velocity $V_c$ is incremented by integrating the commanded acceleration $a_c$ over the loop time. The commanded velocity $V_c$ is incremented by an increasing commanded acceleration $a_c$ between the time 200 and the time 202, incremented by the constant maximum acceleration $a_{max}$ between the time 202 and the time 204, and incremented by a decreasing commanded acceleration $a_c$ between the time 204 and the time 206. The controller 18 then advances to the step 130.

In step 130, the controller 18 determines if the commanded velocity $V_c$ has converged with the desired velocity $V_d$. In particular, the controller 18 determines if the commanded velocity $V_c$ is within a velocity threshold $V_t$ (shown in FIG. 4A) of the desired velocity $V_d$. In the exemplary embodiment, the velocity threshold $V_t$ is less than or equal to one percent of the desired velocity $V_d$. If the desired velocity $V_d$ is within the threshold $V_t$ then the controller 18 advances to the step 132. If the desired velocity $V_d$ is not within the threshold $V_t$ then the controller 18 advances to the step 134.

In the step 132, the commanded velocity $V_c$ has converged with the desired velocity $V_d$. Therefore, the commanded velocity $V_c$ is set to the desired velocity $V_d$. Moreover, the commanded acceleration $a_c$ and the jerk value j are set to zero so as to prevent changes in the commanded velocity $V_c$. The controller 18 then advances to step 134.

In step 134, a single loop of the routine 100 is complete. The values of commanded velocity $V_c$, commanded acceleration $a_c$, and jerk value j are stored in the memory of the controller 18 to be used in subsequent loops through the routine 100.

Figure 6A:
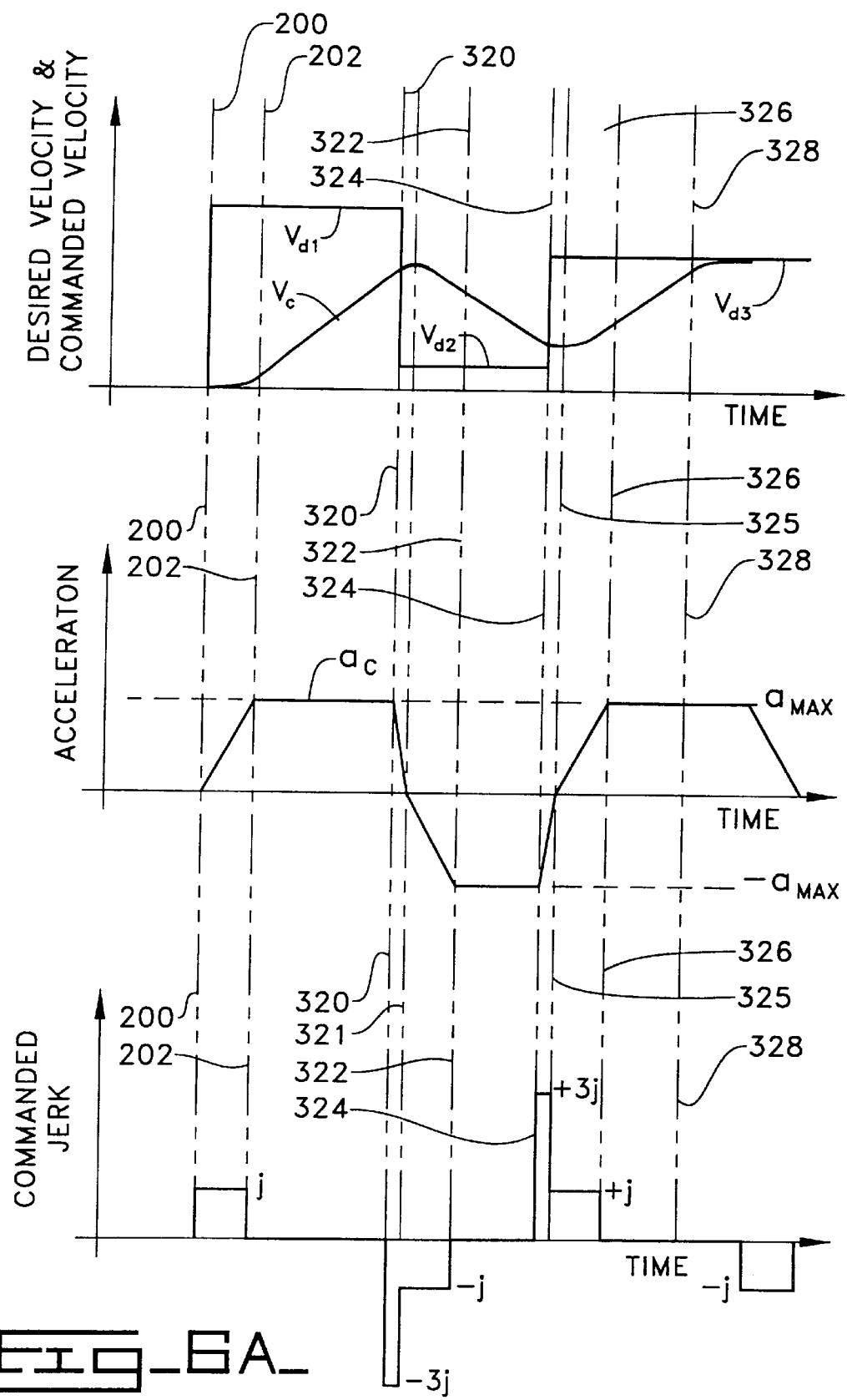
FIG. 6A is a graph which illustrates velocity, acceleration, and jerk in response to the first method of adjusting the commanded acceleration and the commanded velocity in response to rapid changes in desired velocity.

Referring now to FIGS. 5A and 6A, there is shown a first subroutine 300 used to generate the commanded velocity $V_c$ and commanded acceleration $a_c$ in response to the operator changing the desired velocity $V_d$ prior to the commanded velocity $V_c$ converging with the desired velocity $V_d$.

In step 302, if the desired velocity $V_d$ is less than the commanded velocity $V_c$ and the commanded acceleration $a_c$ is greater than zero thereby driving the commanded velocity $V_c$ in the wrong direction, the controller 18 advances to step 306 where the jerk value is set to a negative value at least three times the jerk value j received from the jerk input 71. This condition corresponds to a time 320 where the desired velocity $V_{d2}$ is lowered below the command velocity $V_c$ prior to the command velocity $V_c$ reaching the desired velocity $V_{d1}$ (see FIG. 6A). The jerk value −j can be exceeded by a factor greater than three because the operator has drastically chanced the desired velocity $V_d$ and expects to have a quick response in order to reach the new desired velocity $V_{d2}$. In the exemplary embodiment, a jerk value of −3j is applied to the commanded velocity $a_c$ until the commanded acceleration $a_c$ becomes negative at a time 321. The controller 18 then advances to step 310.

In step 304, if the desired velocity $V_d$ is greater than the commanded velocity $V_c$ and the commanded acceleration $a_c$ is less than zero thereby driving the commanded velocity $V_c$ in the wrong direction, then the controller 18 advances to step 308 where the jerk value is set to a positive value at least three times the jerk value +j received from the jerk input 71. This condition corresponds to a time 324 where the desired velocity $V_{d3}$ is raised above the command velocity $V_c$ prior to the command velocity $V_c$ reaching the desired velocity $V_{d2}$ (see FIG. 6A). In the exemplary embodiment, a jerk value of +3j is applied to the commanded acceleration $a_c$ until the commanded acceleration $a_c$ becomes positive at a time 325. The controller 18 then advances to step 310.

In step 310, the controller 18 then advances to the start of the routine 100.

Referring now to FIGS. 5B and 6B, there is shown a second subroutine 400 used to generate the commanded velocity $V_c$ and commanded acceleration $a_c$ in response to the operator changing the desired velocity $V_d$ prior to the commanded velocity $V_c$ converging with the desired velocity $V_d$.

In step 402, if the desired velocity $V_d$ is less than the commanded velocity $V_c$ and the commanded acceleration $a_c$ is greater than zero thereby driving the commanded velocity $V_c$ in the wrong direction, then the controller 18 advances to step 406 where the commanded acceleration $a_c$ is set to zero. This condition corresponds to a time 420 where the desired velocity $V_{d2}$ is lowered below the command velocity $V_c$ prior to the command velocity $V_c$ reaching the desired velocity $V_{d1}$ (see FIG. 6B). Setting the commanded acceleration $a_c$ to zero is equivalent to applying an infinite negative jerk to the commanded acceleration $a_c$ for an infinitesimal period of time. In a manner similar to the subroutine 300, the jerk value j can be exceeded by a great factor because the operator expects to have a quick response in order to reach the new desired velocity $V_d$. In addition, the actual jerk that the operator feels is limited by the maximum response of the work machine. The controller 18 then advances to step 410.

In step 404, if the desired velocity $V_d$ is greater than the commanded velocity $V_c$ and the commanded acceleration $a_c$ is less than zero thereby driving the commanded velocity $V_c$ in the wrong direction, then the controller 18 advances to step 406 where the commanded acceleration $a_c$ is set to zero. This condition corresponds to a time 424 where the desired velocity $V_{d3}$ is raised above the command velocity $V_c$ prior to the command velocity $V_c$ reaching the desired velocity $V_{d2}$ (see FIG. 6B). Setting the commanded acceleration $a_c$ to zero is equivalent to applying an infinite positive jerk to the commanded acceleration $a_c$ for an infinitesimal period of time. The controller 18 then advances to step 410.

In step 410, the controller 18 advances to the start of the routine 100.

Industrial Applicability

In operation, the operator first determines the desired mode of operation of the work machine. Selecting the mode of operation sets the predetermined jerk limit j with the jerk input device 71 and the maximum acceleration $a_{max}$ with the acceleration input device 73 to match the mode of operation desired by the operator.

The operator inputs a desired velocity $V_d$ into the controller 18 by depressing the pedal 60. Upon receipt of the desired velocity $V_d$, the controller 18 executes the routine 100 and applies a predetermined jerk value j to the commanded acceleration $a_c$. In particular, the jerk value j is integrated over the loop time and added to the commanded acceleration $a_c$. The commanded acceleration $a_c$ is then integrated over the loop time and applied the commanded velocity $V_c$ as shown between the time 200 and the time 202 of FIG. 4. At the time 202, the commanded acceleration $a_c$ is no longer incremented as the commanded acceleration $a_c$ has exceeded the maximum acceleration $a_{max}$.

The commanded velocity $V_c$ is incrementally increased until the controller 18 determines that the final velocity $V_f$ (calculated as described above) exceeds the desired velocity $V_d$. This occurs at the time 204 (shown in FIG. 4) where a negative jerk value −j is subsequently integrated into the commanded acceleration $a_c$ and commanded velocity $V_c$. The negative jerk value −j is integrated into the commanded acceleration $a_c$ until the commanded velocity $V_c$ comes within the threshold velocity $V_t$ of the desired velocity $V_d$ (see FIG. 4A). At this point, the controller 18 determines that the commanded velocity $V_c$ has converged with the desired velocity $V_d$ and the commanded velocity $V_c$ is set to the desired velocity $V_d$. In addition, the commanded acceleration $a_c$ and jerk j are set to zero to prevent further changes in the commanded velocity $V_c$.

However, the operator may change the desired velocity $V_d$ prior to the commanded velocity $V_c$ converging with the desired velocity $V_d$. If the commanded acceleration $a_c$ is positive and the desired velocity $V_d$ is less than the commanded velocity $V_c$, then the commanded velocity $V_c$ must be rapidly changed to provide the operator with good response.

A first subroutine 300 accomplishes the required rapid change in commanded velocity $V_c$ by integrating a negative jerk value that is greater than three times the jerk value j obtained from the jerk input 71. The resultant rapid change in the commanded acceleration $a_c$ and the commanded velocity $V_c$ are shown between the time 320 and the time 321 of FIG. 6A.

A second subroutine 400 accomplishes the required rapid change in commanded velocity $V_c$ by instantaneously setting the commanded acceleration $a_c$ to zero. Setting the commanded acceleration $a_c$ to zero is equivalent to applying an infinite jerk value to the commanded acceleration $a_c$ for an infinitesimal period of time. The resultant rapid change of the commanded acceleration $a_c$ and commanded velocity $V_c$ are shown between the time 420 and the time 422 of FIG. 6B.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

We claim:

1. A control apparatus for a continuously variable transmission, comprising:

a transmission speed sensor which generates actual velocity signals in response measuring a speed of an output shaft of said continuously variable transmission;

a first input device which is positionable in one of a number of positions and generates a desired velocity signals corresponding to said one of said number of positions;

a controller operable to (i) receive said desired velocity signals, (ii) receive said actual velocity signals, (iii) determine when rapid changes in said desired velocity are requested by an operator, and (iv) generate a commanded acceleration and a commanded velocity based on a jerk value which exceeds a predetermined jerk limit in response to said rapid changes in said desired velocity.

2. The apparatus of claim 1, wherein said jerk value used to generate said commanded velocity is greater than or equal to three times said predetermined jerk limit.

3. The apparatus of claim 1, wherein said commanded acceleration is instantaneously set to zero, whereby said jerk value is instantaneously set to infinity for an infinitesimal period of time to affect instantaneous change in said commanded acceleration.

4. The apparatus of claim 1, further comprising a second input device which generates a jerk signal representative of said predetermined jerk value, wherein said operator can adjust said predetermined jerk value j with said second input device.

5. The apparatus of claim 1, wherein:

said controller determines that said rapid change in said desired velocity is requested by an operator when (i) said desired velocity is less than said commanded speed, and (ii) said commanded acceleration is greater than zero, and said controller determines that a rapid in said desired speed is requested by said operator when (i) said desired velocity is greater than said commanded velocity, and (ii) said commanded acceleration is less than zero.

6. The apparatus of claim 1, further comprising a hydrostatic drive having a variable displacement pump and a variable displacement motor, wherein:

said actual velocity signals are compared to said commanded velocity to produce a command signal, said command signal is received by a displacement controller which selectively controls a displacement of one of said variable displacement pump or said variable displacement motor in response to receiving said command signal.

7. The control apparatus of claim 1, wherein said commanded acceleration is limited to a maximum acceleration.

8. The control apparatus of claim 7, further comprising a third input device which generates an acceleration signal representative of said maximum acceleration, wherein said operator can adjust said maximum acceleration with said third input device.

9. The control apparatus of claim 1, wherein said first input device is a pedal which is continuously positionable between a minimum and a maximum position.

10. A method of controlling a continuously variable transmission having (i) a transmission speed sensor which generates an actual velocity signal in response measuring speed of an output shaft of the continuously variable transmission, (ii) a first input device which is positionable in one of a number of positions and generates a desired speed signal corresponding to the one of the number of positions, the method comprising the steps of:

receiving the desired velocity signal;

receiving the actual velocity signal;

determining when rapid changes in desired velocity are requested by an operator;

generating a commanded acceleration and a commanded velocity based on a jerk value which exceeds a predetermined jerk limit in response to the determining step.

11. The method of claim 10, wherein the generating step includes the step of using a jerk value that is greater than or equal to three times the predetermined jerk limit.

12. The method of claim 10, wherein the generating step includes the step of setting the commanded acceleration equal to zero, whereby the jerk value is instantaneously set to infinity for an infinitesimal period of time to affect the instantaneous change in the commanded acceleration.

13. The method of claim 10, the continuously variable transmission further having a second input device which generates a jerk signal representative of the jerk value, the method further comprising the step of adjusting the jerk value with the second input device.

14. The method of claim 10, the determining step further including the steps of:

determining that the rapid change in the desired velocity is requested by an operator when (i) the desired velocity is less than the commanded speed, and (ii) the commanded acceleration is greater than zero, and determining that a rapid in the desired speed is requested by the operator when (i) the desired velocity is greater than the commanded velocity, and (ii) the commanded acceleration is less than zero.

15. The method of claim 10, the continuously variable transmission further having a hydrostatic drive with a variable displacement pump and a variable displacement motor, the method further comprising the steps of:

comparing the actual velocity signal to the commanded velocity to produce a command signal;

using the command signal to selectively control a displacement of one of the variable displacement pump or the variable displacement motor.

16. The method of claim 10, further comprising the step of limiting the commanded acceleration to a maximum acceleration.

17. The method of claim 16, the continuously variable transmission further having a third input device which generates an acceleration signal representative of the maximum acceleration, further comprising the step of adjusting the maximum acceleration with the third input device.

18. The method of claim 10, the first input device comprising a pedal which is (i) continuously positionable between a minimum and a maximum position and (ii) generates a pedal position signal in response to being positioned between the minimum and maximum position, and the receiving the desired speed step further including the step of receiving a position signal from the pedal.

* * * * *